United States Patent
Chung et al.

(10) Patent No.: US 9,450,641 B2
(45) Date of Patent: Sep. 20, 2016

(54) ALL-DIGITAL SPREAD SPECTRUM CLOCK GENERATING CIRCUIT WITH EMI REDUCTION EFFECT AND A METHOD FOR CONTROLLING THE SAME

(71) Applicant: NATIONAL CHUNG CHENG UNIVERSITY, Chiayi County (TW)

(72) Inventors: Ching-Che Chung, Chia-Yi (TW); Wei-Da Ho, Yilan Country (TW)

(73) Assignee: National Chung Cheng University, Chiayi County (TW)

( * ) Notice: Subject to any disclaimer, the term of this patent is extended or adjusted under 35 U.S.C. 154(b) by 415 days.

(21) Appl. No.: 13/863,520

(22) Filed: Apr. 16, 2013

(65) Prior Publication Data

US 2014/0177681 A1    Jun. 26, 2014

(30) Foreign Application Priority Data

Dec. 21, 2012 (TW) .............................. 101149213 A

(51) Int. Cl.
| | | |
|---|---|---|
| *H04B 1/7097* | (2011.01) | |
| *G06F 1/08* | (2006.01) | |
| *H04B 1/69* | (2011.01) | |

(52) U.S. Cl.
CPC ............... *H04B 1/7097* (2013.01); *G06F 1/08* (2013.01); *H04B 1/69* (2013.01)

(58) Field of Classification Search
CPC ....... H03L 7/1976; H03L 7/23; H03L 7/197; H03L 7/089; H03C 3/095; H03C 3/0916; H03C 3/0925; H03C 3/0966; H03C 3/0975
See application file for complete search history.

(56) References Cited

U.S. PATENT DOCUMENTS

| | | | | |
|---|---|---|---|---|
| 8,433,024 | B2* | 4/2013 | Chiang | H04B 1/69 375/130 |
| 2007/0153129 | A1* | 7/2007 | Kawamoto | G06F 1/12 348/705 |
| 2009/0066423 | A1* | 3/2009 | Sareen | H03L 7/0996 331/19 |
| 2011/0204940 | A1* | 8/2011 | Kanda | H03C 3/095 327/157 |
| 2012/0076176 | A1* | 3/2012 | Gelhausen | H03L 7/18 375/146 |
| 2014/0177681 | A1* | 6/2014 | Chung | H04B 1/7097 375/146 |

OTHER PUBLICATIONS

Ho, Wei-Da; Design of All-Digital Spread Spectrum Clock Generator with High EMI Reduction, Thesis, National Chung Cheng University, Jul. 2, 2012.

* cited by examiner

*Primary Examiner* — Daniel Washburn
*Assistant Examiner* — Eboni Hughes
(74) *Attorney, Agent, or Firm* — Rosenberg, Klein & Lee

(57) ABSTRACT

An all-digital spread spectrum clock generating circuit with EMI reduction effect and a method for controlling the same utilize a digital spread-spectrum clock controlling unit to control a digital controlled oscillator, so that it can directly modulates an output clock frequency. Accordingly, the spectrum of the output clock frequency is spread, and the EMI effect due to the output clock signal is reduced. A spread-spectrum clock controller receives a reference clock counting signal and a dividing clock counting signal generated by a frequency detecting unit. After detecting and judging, the spread-spectrum clock controlling unit modulates and maintains a central frequency of the spread-spectrum clock periodically according to the two counting signals, thereby keeping a stability of the central frequency of the spread-spectrum clock signal and decreasing the complexity of the circuit design.

7 Claims, 4 Drawing Sheets

ALL-DIGITAL SPREAD SPECTRUM CLOCK GENERATING CIRCUIT WITH EMI REDUCTION EFFECT AND A METHOD FOR CONTROLLING THE SAME

BACKGROUND OF THE INVENTION

1. Field of the Invention

The present invention relates to a clock circuit and a controlling method of the same, especially to an all-digital spread spectrum clock generating circuit with EMI reduction effect and a method of controlling the same.

2. Description of the Related Art

Recently, digital devices are quite popular. The communication, the exchange, and the processing of the digital data among the digital devices need a clock signal to synchronically transmit the data so as to process the digital signal or the data attached to the digital signal. For example, the CPU in the computer cooperates with the clock signal to allow each digital circuit in the CPU to properly access and process data or control the hardware. Further, in mobile devices, we also need the clock to trigger the transmission of the digital data. If the data are to be accessed among the digital devices accurately, the clock has to be synchronized. Herein, the synchronization can be achieved by dividing or multiplying the frequency so as to acquire different clocks with different clock frequencies but still be synchronized. Accordingly, the digital data can be processed among various digital circuits.

However, the clock speed is constantly increased when the digital system utilizes the digital clock signal provided by the digital clock circuit. Wherein, the EMI (Electromagnetic Interference) is adversely resulted. Namely, the clock signal provided by the digital clock signal unfavorably causes the EMI. Thus, the digital system has to conquer the EMI generated by the clock signal. Moreover, in the design of electronic system, the EMI reduction has to be taken into account. A Spread-Spectrum Clock Generator (SSCG) is mostly applied to reduce the EMI caused by the clock. There are many kinds of circuit structures of the SSCG in the market. A conventional analog spread-spectrum clock generator (Analog SSCG) directly performs a triangular modulation to the controlling voltage of the voltage-controlled oscillator so as to spread the spectrum of the output frequency. This conventional Analog SSCG needs a loop filter with a large on-chip capacitor. Thus, a large chip area has to be occupied by the SSCG circuits. Moreover, in considering the variations that may occur during manufacturing, the variation of capacitance may reach 30%. As a result, the conventional SSCG may be unstable with process variations.

The disclosed digital SSCGs in the market mostly utilize a delta-sigma modulator (DSM) to switch N/N+1, the ratio of the loop divider, so that the output clock frequency can be close to the triangular modulation. However, the phase-locked loop still controls the oscillator according to the frequency error and the phase error compared to the reference clock signal during the triangular modulation. Thus, the phase and frequency tracking of the phase-locked loop to the reference clock signal interferes the triangular modulation. Accordingly, most of the measured modulation of the output frequency is close to a Sine Modulation. Herein, while observing the sine modulation on the power spectrum, peak powers are generated at two sides of the spreading range, which lessens the EMI reduction. Although the Hershey-kiss modulation can solve this problem, the Hershey-kiss modulation is complicated. Consequently, the circuit design of the SSCG with Hershey-kiss modulation also becomes complex. Obviously, the conventional SSCG can not conquer the EMI reduction, and it is also difficult to extensively apply a useful technique to solve the problem. Therefore, we need a technique that can efficiently reduce the EMI while the arrangement of the circuits is simple.

Continuingly, the conventional analog SSCG is disadvantageous in that the design may occupy a large chip area and the power consumption is also high. Limited by the voltage control scheme, the conventional analog SSCG can not be operated in a low voltage system (<1.0V). Thus, it is difficult for the conventional analog SSCG to be designed in the sub-micron manufacturing process with a low supply voltage. Further, the conventional analog SSCG easily affected by the process, voltage, and temperature (PVT) variations, which incurs an abnormal operation.

It brings the present invention to provide an all-digital spread spectrum clock generating circuit with EMI reduction effect and a method for controlling the same. The triangular modulation is directly applied to a digital controlled oscillator (DCO) so as to spread a spectrum of an output clock signal. The present invention also utilizes and compares counting results of a reference clock signal and a dividing clock signal to control the output clock signal for maintaining a central frequency of a spread-spectrum clock signal under PVT variations.

SUMMARY OF THE INVENTION

An object of the present invention is to provide an all-digital spread spectrum clock generating circuit with EMI reduction effect and a method for controlling the same. The present invention utilizes and compares counting results of a reference clock signal and a dividing clock signal to maintain a central frequency of an output clock signal. Accordingly, the process, voltage, and temperature variations do not influence the EMI reduction effect that much.

A further object of the present invention is to provide an all-digital spread spectrum clock generating circuit with EMI reduction effect and a method for controlling the same. The present invention preferably provides a simplified circuit design.

A further object of the present invention is to provide an all-digital spread spectrum clock generating circuit with EMI reduction effect and a method for controlling the same. A digital spread-spectrum clock controlling unit can generate an output that is quite close to the triangular modulation with a delta-sigma modulator controlling an output clock signal of a digital controlled oscillator. Wherein, the output frequency is quite close to the triangular modulation, which increases the EMI reduction effect.

The all-digital spread spectrum clock generating circuit with EMI reduction effect and a method for controlling the same comprises a phase frequency detecting unit, a spread-spectrum clock controlling unit, a digital controlled oscillator, a delta-sigma modulator, a dividing-by-8 unit, a digital loop filter, a dividing unit, and a frequency detecting unit. Wherein, the operating clock speed of the delta-sigma modulator is referred as an output clock signal frequency divided by the dividing-by-8 unit. The output clock signal outputs a dividing clock signal (DIV_CLK) via a dividing unit. The dividing ratio M can be input and set externally. The output spreading range (spread-spectrum range, SR) of the present invention can be also input and set externally for being suited to different needs.

The phase frequency detecting unit detects a reference clock signal and a dividing clock signal so as to generate a detecting signal to the spread-spectrum clock controlling unit. In addition, the frequency detecting unit detects the reference clock signal and the dividing clock signal so as to generate a reference clock counting signal (count_ref) and a dividing clock counting signal (count_div) to the spread-spectrum clock controlling unit. Firstly, the spread-spectrum clock controlling unit tracks the frequency and phase of the reference clock signal according to the detecting signal generated by the phase frequency detecting unit, and it controls the delta-sigma modulator with the digital controlled oscillator to generate the required central frequency of the output clock. Subsequently, the spread-spectrum clock controlling unit directly controls the delta-sigma modulator to modulate the digital controlled oscillator to generate a triangular modulation profile. Preferably, the power spectrum of the output clock is spread. At the end of each triangular modulation cycle, the output frequency goes back to the central frequency. The spread-spectrum clock controlling unit adjusts the output clock frequency according to the counting signals output by the frequency detecting unit so as to maintain the stability of the central frequency of a spread-spectrum clock signal. Favorably, a simplified spread spectrum clock generating circuit is provided, which preferably improves the EMI reduction effect.

DETAILED DESCRIPTION OF THE PREFERRED EMBODIMENTS

The advantages of the present invention over the known prior art will become more apparent to those of ordinary skilled in the art upon reading the following descriptions in junction with the accompanying drawings.

Figure 1:
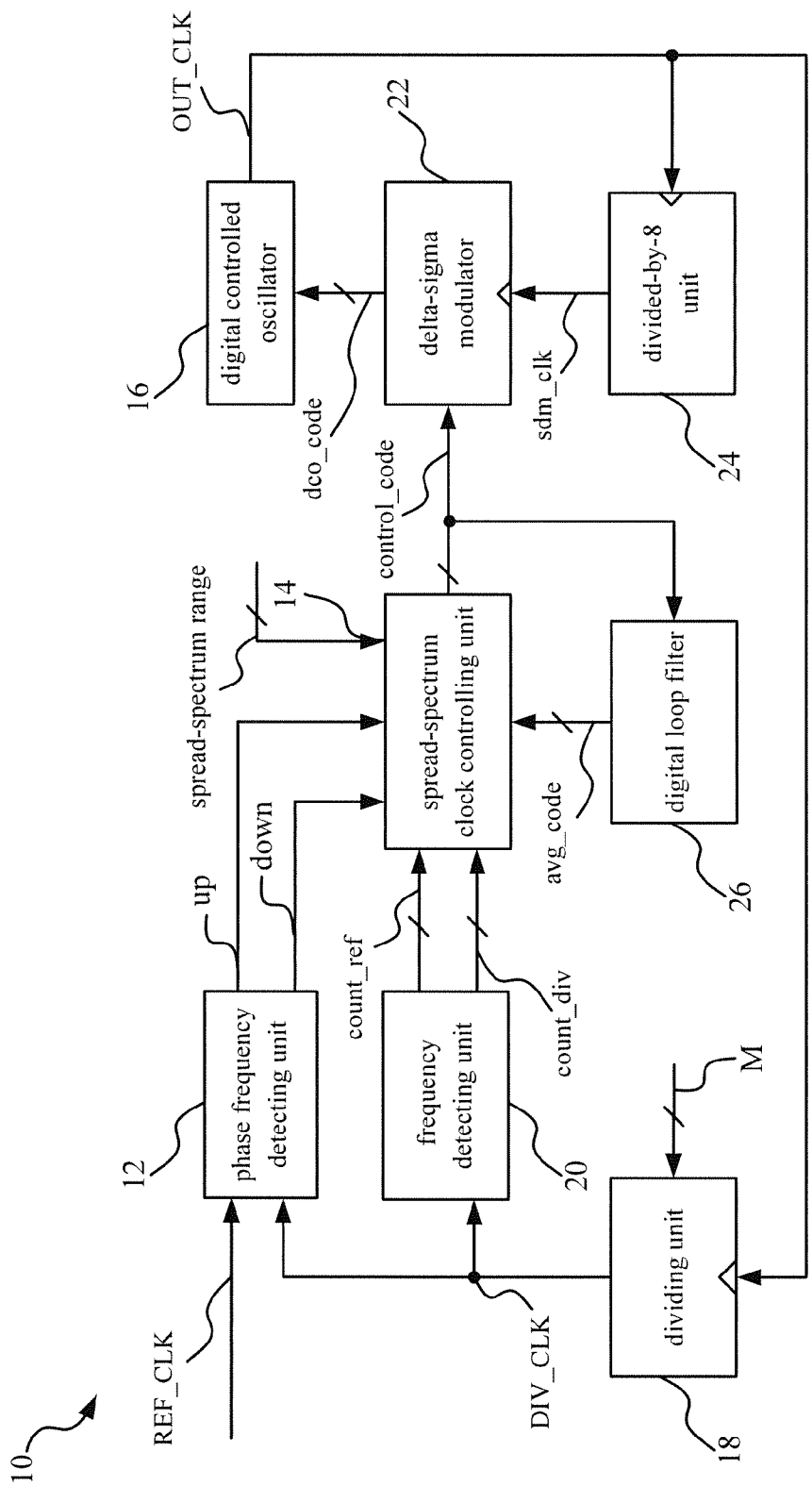
FIG. 1 is a block diagram of a preferred embodiment of the present invention.

Referring to FIG. 1, a block diagram of a preferred embodiment of the present invention is shown. An all-digital spread spectrum clock generating circuit 10 with EMI reduction effect comprises a phase frequency detecting unit 12, a spread-spectrum clock controlling unit 14, a digital controlled oscillator 16, a dividing unit 18, and a frequency detecting unit 20. Besides, the all-digital spread spectrum clock generating circuit 10 further comprises a delta-sigma modulator 22, a divided-by-8 unit 24, and a digital loop filter 26.

The phase frequency detecting unit 12 is coupled to the spread-spectrum clock controlling unit 14 and the dividing unit 18 so as to receive a reference clock signal (REF_CLK) and a dividing clock signal (DIV_CLK), thereby generating a plurality of detecting signals to the spread-spectrum clock controlling unit 14. The detecting signals include a first potential signal and a second potential signal. In this embodiment, an "up" signal and a "down" signal are provided as an example. The spread-spectrum clock controlling unit 14 in this preferred embodiment is a spreading-spectrum clock (SSC) controller that is further coupled to the phase frequency detecting unit 12, the frequency detecting unit 20, the delta-sigma modulator 22, and the digital loop filter 26 so as to receive an input signal of a spreading range (SR). Subsequently, the spread-spectrum clock controlling unit 14 receives the detecting signals generated by the phase frequency detecting unit 12 and the frequency detecting unit 20 and then generates a delta-sigma modulator control signal (control_code) according to the detecting signals. Then, the delta-sigma modulator 22 generates an oscillator control signal (dco_code) to control the digital controlled oscillator 16 to generate an output clock signal (OUT_CLK). The dividing unit 18 receives the output clock signal (OUT_CLK) so as to correspondingly generate the dividing clock signal (DIV_CLK). The frequency detecting unit 20 also receives the reference clock signal (REF_CLK) and the dividing clock signal (DIV_CLK) so as to correspondingly generate a reference clock counting signal (count_ref) and a dividing clock counting signal (count_div) to the spread-spectrum clock controlling unit 14.

Besides, the delta-sigma modulator 22 of the present invention receives the delta-sigma modulator control signal (control_code) generated by the spread-spectrum clock controlling unit 14 so as to correspondingly generate an oscillator control signal (dco_code) to the digital controlled oscillator 16. Thereby, the digital controlled oscillator 16 is able to generate the output clock signal (OUT_CLK). The delta-sigma modulator 22 enhances the average timing resolution of the digital controlled oscillator 16. The divided-by-8 unit 24 is coupled to the digital controlled oscillator 16 and the delta-sigma modulator 22, so that the divided-by-8 unit 24 is served as a frequency divider that generates an operating clock signal (sdm_clk) from the output clock signal (OUT_CLK) for the delta-sigma modulator 22. Thereby, the signal sdm_clk is provided as an operating clock for the delta-sigma modulator 22. The divided-by-8 unit is just an example of this preferred embodiment. Namely, this frequency divider is not limited to divided-by-8; it can be divided-by 2, 4, or 16 according to the practical needs. For example, the frequency divider can be a divided-by-32 unit or divided-by-64 unit. The spread-spectrum clock controlling unit 14 is further coupled to a digital loop filter 26 that generates an average signal (avg_code) according to the delta-sigma modulator control signal (control_code) to the spread-spectrum clock controlling unit 14. Thereby, the influence of the reference clock jitter on the central frequency of the output clock signal (OUT_CLK) can be decreased.

Figure 4:
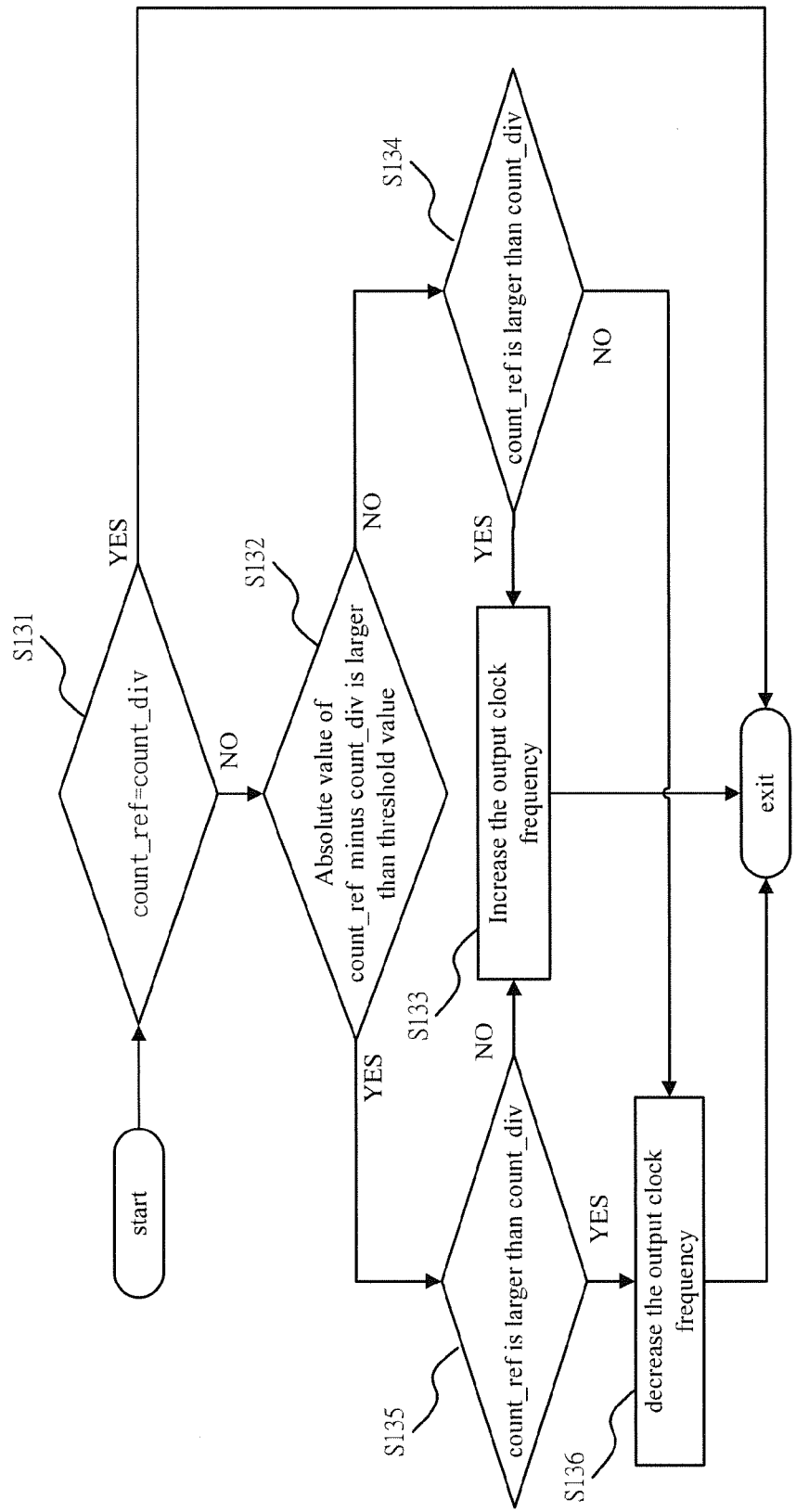
FIG. 4 is a flowchart of the preferred embodiment of the present invention in adjusting the central frequency of the output clock.

Referring to FIG. 1 again, the reference clock counting signal (count_ref) and the dividing clock counting signal (count_div) generated by the frequency detecting unit 20 are by counting the cycle number of the reference clock signal (REF_CLK) and the dividing clock signal (DIV_CLK) in each triangular modulation cycle. The spread-spectrum clock controlling unit 14 compares whether the counting results of the reference clock counting signal (count_ref) and the dividing clock counting signal (count_div) are the same to judge if the central frequency of the output clock signal OUT_CLK is varied with the PVT variations. When the spread-spectrum clock controlling unit 14 compares the counting results of the reference clock counting signal (count_ref) and the dividing clock counting signal (count_div), as shown in FIG. 4, the spread-spectrum clock controlling unit 14 decides whether the delta-sigma modulator control signal (control_code) should be increased or decreased so as to correspondingly increase or decrease the central frequency of the output clock. Accordingly, the stability of the central frequency can be maintained while the output clock signal is conducted with the spectrum spreading.

As previously described, the frequency detecting unit 20 receives the reference clock signal (REF_CLK) and the dividing clock signal (DIV_CLK) divided by the digital controlled oscillator 16 via the dividing unit 18, so that the frequency detecting unit 20 is able to give feedback and control the delta-sigma modulator control signal (control_code) output by the spread-spectrum clock controlling unit 14. Then, the spread-spectrum clock controlling unit 14 controls the delta-sigma modulator 22 to adjust the central frequency of the output clock signal (OUT_CLK) outputted by the digital controlled oscillator 16.

Figure 2:
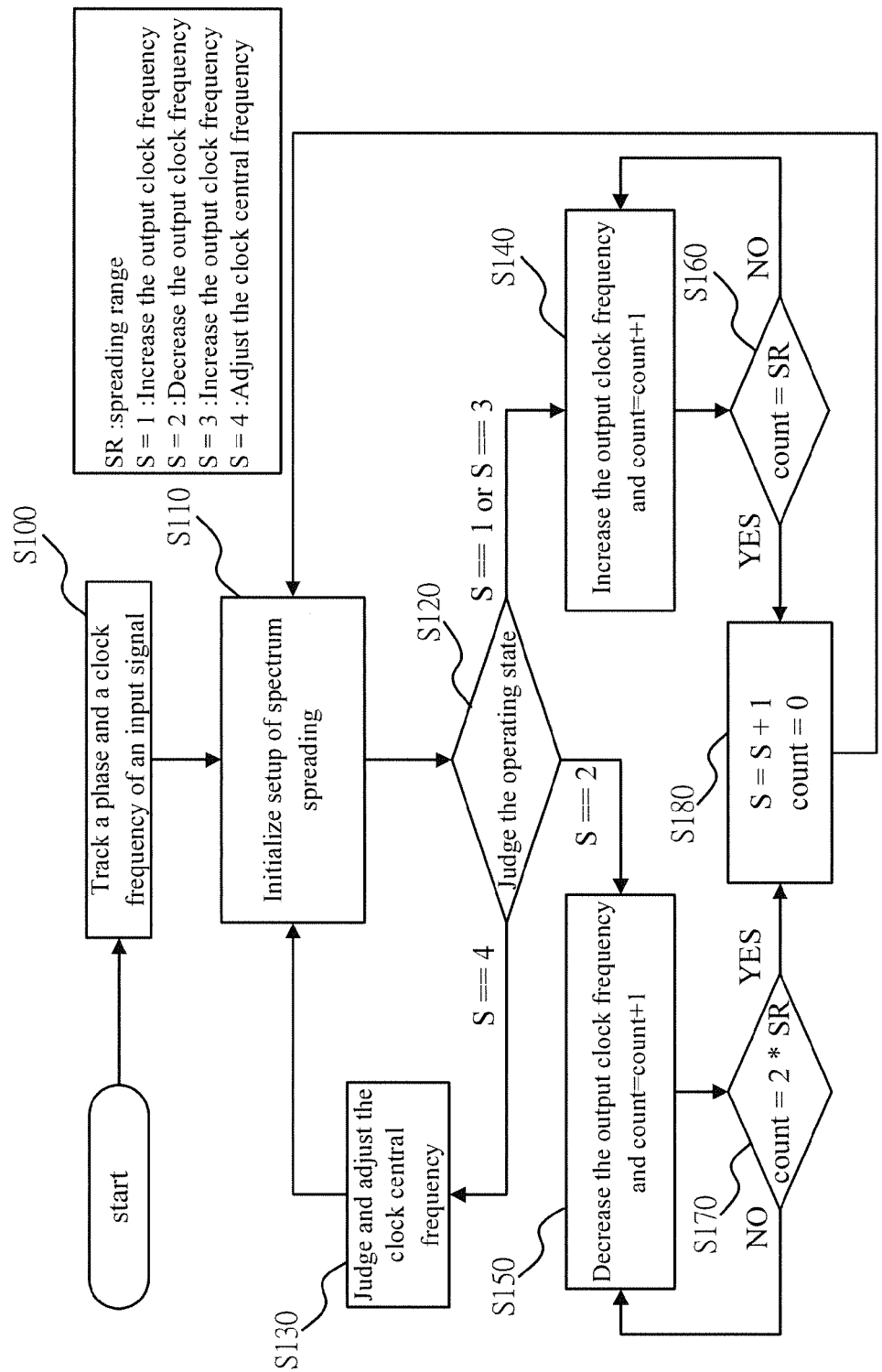
FIG. 2 is a flowchart of the preferred embodiment of the present invention.

Accompanying with FIGS. 1 to 4, a block diagram, a flowchart of spectrum spreading, an illustration in detecting frequency drift of the central frequency of the spread-spectrum clock, and a flowchart in adjusting the central frequency of the output clock are shown. Referring to FIG. 2, steps for a method for controlling the all-digital spread spectrum clock generating circuit of the present invention are as follows:

Step S100: Track phase and frequency of an input signal;
Step S110: Initialize setup of spectrum spreading;
Step S120: Judge the operating state of the spread-spectrum clock controlling unit;
Step S130: Judge and adjust the clock central frequency;
Step S140: Increase the output clock frequency and increase the counter value (count);
Step S150: Decrease the output clock frequency and increase the counter value (count);
Step S160: Judge if the counting result equals the spreading range (SR);
Step S170: Judge if the counting result equals two times of the spreading range (SR); and
Step S180: Update the operating state of the controlling unit and then clear the counting result.

In step S100, the phase frequency detecting unit 12 continues detecting the phase error and frequency error between the reference clock signal (REF_CLK) and the dividing clock signal DIV_CLK so as to generate at least one detecting signal, such as an "up" signal or a "down" signal. Then, the detecting signal is transmitted to the spread-spectrum clock controlling unit 14. In this step, the spread-spectrum clock controlling unit 14 operates as a typical phase-locked loop controller that adjusts the sigma-delta modulator control signal (control_code) according to the detecting signal outputted by the phase frequency detecting unit 12. Accordingly, the output frequency of the digital controlled oscillator 16 can be adjusted. After tracking the phase and the frequency of the reference clock signal, the frequency of the output clock (OUT_CLK) should be M times of the frequency of the reference clock (REF_CLK). Wherein, M can be input and set externally. After the PLL loop finishes locking the phase and the frequency of the reference clock of the first time, the spread-spectrum clock controlling unit 14 does not refer to the output signal of the phase frequency detecting unit 12 anymore. Nonetheless, the spread-spectrum clock controlling unit 14 enters the spectrum spreading mode. In step S110, a setting value of the spread-spectrum clock controlling unit 14 is initialized. For example, the value of the sigma-delta modulator control signal (control_code) is set as the average signal (avg_code) outputted from the digital loop filter 26 to the spread-spectrum clock controlling unit 14. Additionally, a spectrum spreading state (S) is initially set by 1, and the counter value (count) is initially set by 0.

In step S120, the spread-spectrum clock controlling unit 14 judges the current operating state. Herein, when the spectrum spreading state (S) is 1 or 3, the step S140 continues. When the spectrum spreading state is 2, the step S150 continues. When the spectrum spreading state is 4, the step S130 continues. In the step S140, the spread-spectrum clock controlling unit 14 increases the value of the sigma-delta modulator control signal (control_code=control_code+1) so as to increase the output clock frequency and concurrently accumulate the counter value (count=count+1). Subsequently, in the step S160, the spread-spectrum clock controlling unit 14 judges if the accumulated counter value reaches the spreading range (SR). If the accumulated counter value does not reach the spreading range (SR) yet, the step 140 is repeated so as to continue increasing the output clock frequency. Oppositely, if the accumulated counter value reaches the spreading range (SR), the step S180 continues so as to update the spectrum spreading state (S=S+1), thereby zeroing the counter value.

Figure 3:
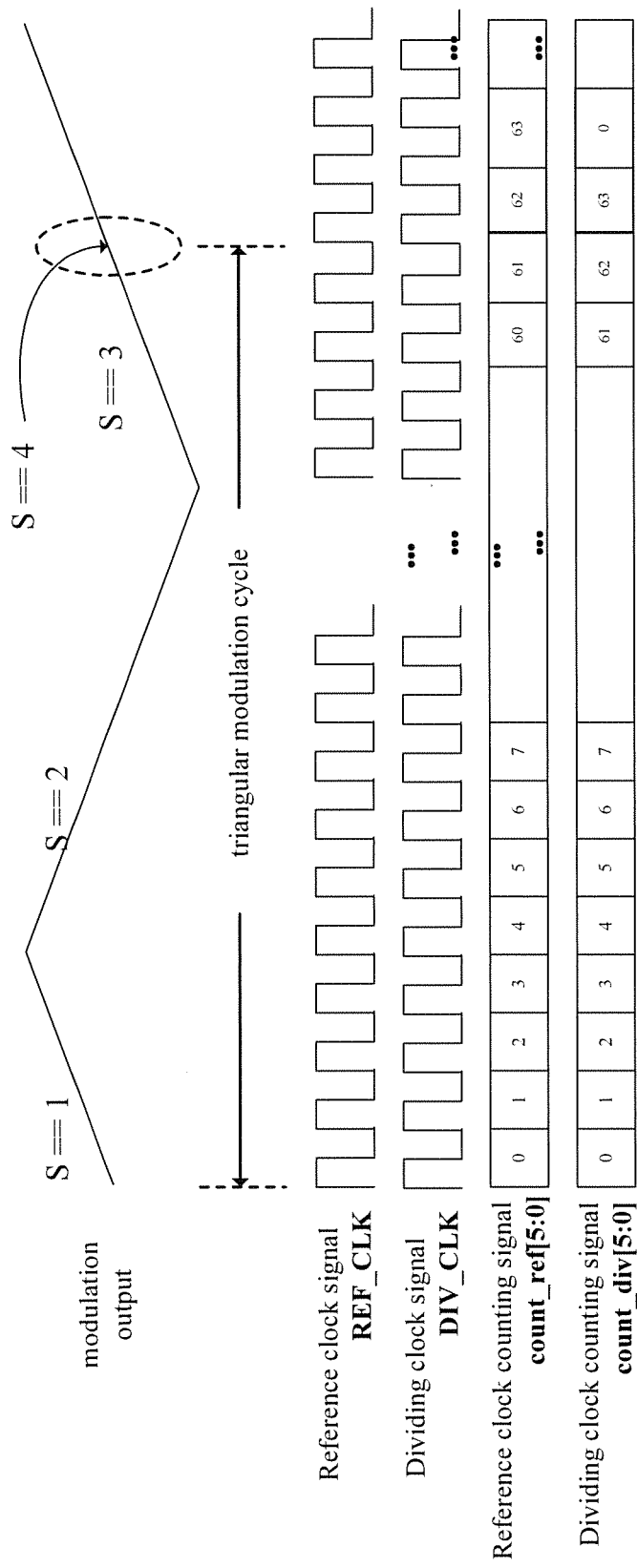
FIG. 3 shows the preferred embodiment of the present invention in detecting frequency drift of the central frequency of the spread-spectrum clock.

In step S120, when the spectrum spreading state (S) is 2, the step S150 continues. In the step S150, the spread-spectrum clock controlling unit 14 decreases the value of the sigma-delta modulator control signal (control_code=control_code−1) so as to decrease the output clock frequency and accumulate the counter value (count=count+1). Then, in step S170, the spread-spectrum clock controlling unit 14 judges if the accumulated counter value reaches two times of the spreading range (SR). If the accumulated counter value does not reach two times of the spreading range (SR), the step S150 is repeated so as to continue decreasing the output clock frequency. Oppositely, if the accumulated counter value reaches two times of the spreading range (SR), the step S180 continues so as to update the spectrum spreading state (S=S+1), thereby zeroing the counter value. FIG. 3 shows the triangular modulation on the output frequency over time. Herein, the frequency of the output clock presents a triangular modulation so as to spread the spectrum of the output clock frequency. The spreading range (SR) shown in FIG. 2 can be input and set externally to control the spread range of the output frequency, as shown in FIG. 3. Herein, after the spectrum spreading state (S) is changed into 4, the spectrum spreading state goes back to 1 after updated. Whereby, one cycle of the triangular modulation is completed.

Referring to FIG. 3, the frequency detecting unit 20 receives the reference clock signal (REF_CLK) and the dividing clock signal (DIV_CLK) from the dividing unit 18 so as to correspondingly generate the reference clock counting signal (count_ref) and the dividing clock counting signal (count_div) to the spread-spectrum clock controlling unit 14. The counting period is shown in FIG. 3, the frequency detecting unit 20 counts the cycle number of the reference clock signal (REF_CLK) and the dividing clock signal (DIV_CLK) in one triangular modulation cycle.

In step S120 in FIG. 2, when the spectrum spreading state (S) is 4, the step S130 continues. FIG. 4 depicts the step S130.

As shown in FIG. 4, in step S130, the spread-spectrum clock controlling unit 14 compares the reference clock counting signal (count_ref) with the dividing clock counting signal (count_div) so as to continue the following steps according to the comparing result:

Step S131: Judge if the reference clock counting signal (count_ref) and the dividing clock counting signal (count_div) are the same;

Step S132: Judge if the absolute value of the reference clock counting value (count_ref) minus the dividing clock counting value (count_div) is larger than a threshold value;

Step S133: Increase the output clock frequency;

Step S134: Judge if the reference clock counting signal (count_ref) is larger than the dividing clock counting signal (count_div);

Step S135: Judge if the reference clock counting signal (count_ref) is larger than the dividing clock counting signal (count_div); and Step S136: Decrease the output clock frequency.

In step S131, the spread-spectrum clock controlling unit 14 judges if the central frequency of the output clock OUT_CLK should be adjusted. When the reference clock counting signal (count_ref) equals to the dividing clock counting signal (count_div), the average frequency of the dividing clock and the reference clock are the same. Namely, the central frequency of the output clock signal (OUT_CLK) does not need to be adjusted, thereby exiting the step S130. When the reference counting signal (count_ref) is unequal to the dividing counting signal (count_div), the step S132 continues. In Step S132, the spread-spectrum clock controlling unit 14 judges if there is an overflowed counting result in the counter circuits. When absolute value of the reference clock counting signal (count_ref) minus the dividing counting signal (count_div) is smaller than the threshold value, the step S134 continues. When the absolute value of the reference clock counting signal (count_ref) minus the dividing clock counting signal (count_div) is larger than the threshold value, the step S135 continues. The threshold value applied in the step S132 is decided by the bit number of the counter bit in the frequency detecting unit 20. For example, if the bit number of the counter is 6-bit, the threshold value is 32. Namely, if the bit number of the counter in the frequency detecting unit 20 is n-bit, the threshold value is 2 to the power of n−1.

In the step S134, if the spread-spectrum clock controlling unit 14 determines there is no overflowed counting result, the subsequent operation is judged as follows. When the counting result of the reference clock counting signal (count_ ref) is larger than the counting result of the dividing clock counting signal (count_div), it means that the average frequency of the dividing clock signal (DIV_CLK) is slower than the average frequency of the reference clock signal (REF_CLK). Accordingly, the step S133 continues. When the counting result of the reference clock counting signal (count_ref) is smaller than the counting result of the dividing clock counting signal (count_div), it means that the average frequency of the dividing clock signal (DIV_CLK) is faster than the average frequency of the reference clock signal (REF_CLK). Thus, the step S136 continues. In the step S133, the spread-spectrum clock controlling unit 14 increases the delta-sigma modulator control signal (control_code=control_code+1), so that the delta-sigma modulator 22 can correspondingly generate the oscillator control signal (dco_code) for increasing the clock frequency. Thereby, the digital controlled oscillator 16 is able to increase the output clock frequency. In the step S136, the spread-spectrum clock controlling unit 14 decreases the delta-sigma modulator control signal (control_code=control_code−1). Accordingly, the delta-sigma modulator 22 correspondingly generates the oscillator control signal (dco_code) for decreasing the clock frequency, so that the digital controlled oscillator 16 decreases the output clock frequency.

In the step S135, the spread-spectrum clock controlling unit 14 judges the subsequent operation while the counting result is overflowed. Herein, when the counting result of the reference clock counting signal (count_ref) is larger than the counting result of the dividing clock counting signal (count_ div), it means that the value of the dividing clock counting signal count_div overflows. Accordingly, the average frequency of the dividing clock signal (DIV_CLK) is faster than the average frequency of the reference clock signal (REF_CLK); thus, the step S136 continues. When the value of the reference clock counting signal (count_ref) is smaller than the counting value of the dividing clock counting signal (count_div), it means that the value of the reference clock counting signal (count_ref) overflows. Therefore, the average frequency of the reference clock signal (REF_CLK) is faster than the average frequency of the dividing clock signal (DIV_CLK); thus, the step S133 continues.

To sum up, the all-digital spread spectrum clock generating circuit with EMI reduction effect and the method for controlling the same of the present invention allows the digital controlled oscillator to provide a reflected dividing signal via the dividing unit to the frequency detecting unit. Accordingly, two counting signals are reflected to the spread-spectrum clock controlling unit. Namely, the reference clock counting signal and the dividing clock counting signal are reflected to the spread-spectrum clock controlling unit. Whereby, when the triangular modulation completes one modulation cycle and the output clock frequency goes back to the central frequency, the central frequency of the output clock can be slightly adjusted. As a result, the triangular modulation is directly applied to the digital controlled oscillator to achieve the spectrum spreading, which preferably lowers the EMI, and the design of circuit can be simplified.

We claim:

1. An all-digital spread spectrum clock generating circuit with EMI reduction effect comprising:
   a spread-spectrum clock controlling unit that receives and generates a delta-sigma modulator control signal according to at least one phase and frequency detecting signal, a reference clock counting signal, and a dividing clock counting signal;
   a phase frequency detecting unit that receives and detects a reference clock signal and a dividing clock signal so as to correspondingly generate said phase and frequency detecting signal;
   a digital controlled oscillator that generates an output clock signal according to said-a delta-sigma modulator control signal;
   a dividing unit that is coupled to said digital controlled oscillator and receives said output clock signal so as to divide said output clock signal and generate a dividing clock signal; and
   a frequency detecting unit that receives said dividing clock signal and said reference clock signal so as to generate said reference clock counting signal and said dividing clock counting signal according to said dividing clock signal and said reference clock signal; said spread-spectrum clock controlling unit adjusting a central frequency of said output clock signal according to said reference clock counting signal and said dividing clock counting signal,
   wherein, said spread-spectrum clock controlling unit reads and compares counting results of said reference clock counting signal and said dividing clock counting signal; if said counting result of said reference clock counting signal is larger than said counting result of said dividing clock counting signal, said spread-spectrum clock controlling unit allows said output clock signal to increase the clock frequency; if said counting result of said dividing clock counting signal is larger than said counting result of said reference clock counting signal, said spread-spectrum clock controlling unit allows said output clock signal to decrease said clock frequency.

2. The circuit as claimed in claim 1 further comprises:
a delta-sigma modulator that is coupled between said spread-spectrum clock controlling unit and said digital controlled oscillator; said delta-sigma modulator generates an oscillator control signal to said digital controlled oscillator according to said delta-sigma modulator control signal; said digital controlled oscillator receives said oscillator control signal and correspondingly generates said output clock signal; and
a frequency divider that generates a divided clock signal according to said output clock signal to said delta-sigma modulator; said delta-sigma modulator controls an outputting of said oscillator control signal according to said the divided clock signal.

3. The circuit as claimed in claim 2, wherein, said digital controlled oscillator is controlled by said delta-sigma modulator to subject said output clock signal to a triangular modulation.

4. The circuit as claimed in claim 1, wherein, said phase and frequency detecting signal includes a first potential signal and a second potential signal; said spread-spectrum clock controlling unit allows the frequency and phase of said reference clock signal to be tracked according to said first potential signal and said second potential signal.

5. A method for controlling an all-digital spread spectrum clock generating circuit comprising:
a phase frequency detecting unit detecting a reference clock signal and a dividing clock signal so as to generate a phase and frequency detecting signal;
a frequency detecting unit detecting a reference clock signal and a dividing clock signal so as to generate a reference clock counting signal and a dividing clock counting signal;
a spread-spectrum clock controlling unit generating a delta-sigma modulator control signal according to said phase and frequency detecting signal, a reference clock counting signal, and a dividing clock counting signal;
a digital controlled oscillator generating an output clock signal according to said delta-sigma modulator control signal;
dividing said output clock signal so as to generate a dividing clock signal;
detecting said reference clock signal and said dividing clock signal so as to generate said reference clock counting signal and said dividing clock counting signal; and
adjusting a central frequency of said output clock signal according to said reference clock counting signal and said dividing clock counting signal,
wherein, said spread-spectrum clock controlling unit reads and compares counting results said reference clock counting signal with said dividing clock counting signal; if a counting result of said reference clock counting signal is larger than a counting result of said dividing clock counting signal, said output clock signal is controlled to increase the clock frequency; if said counting result of said dividing clock counting signal is larger than said counting result of said reference clock counting signal, said output clock signal is controlled to decrease said clock frequency.

6. The method as claimed in claim 5, wherein, a step of said digital controlled oscillator generating an output clock signal according to said delta-sigma modulator control signal includes: a delta-sigma modulator generating an oscillator control signal according to said delta-sigma modulator control signal; and said digital controlled oscillator controlling said output clock signal according to said oscillator control signal so as to change an outputting frequency of said output clock signal.

7. The method as claimed in claim 6, wherein, said digital controlled oscillator is controlled by said delta-sigma modulator to subject said output clock signal to a triangular modulation.

* * * * *